Dec. 31, 1940.    H. H. STRAUS    2,226,953
METHOD OF PRODUCING REINFORCED SHEET CORK
Filed Oct. 20, 1936    3 Sheets-Sheet 1
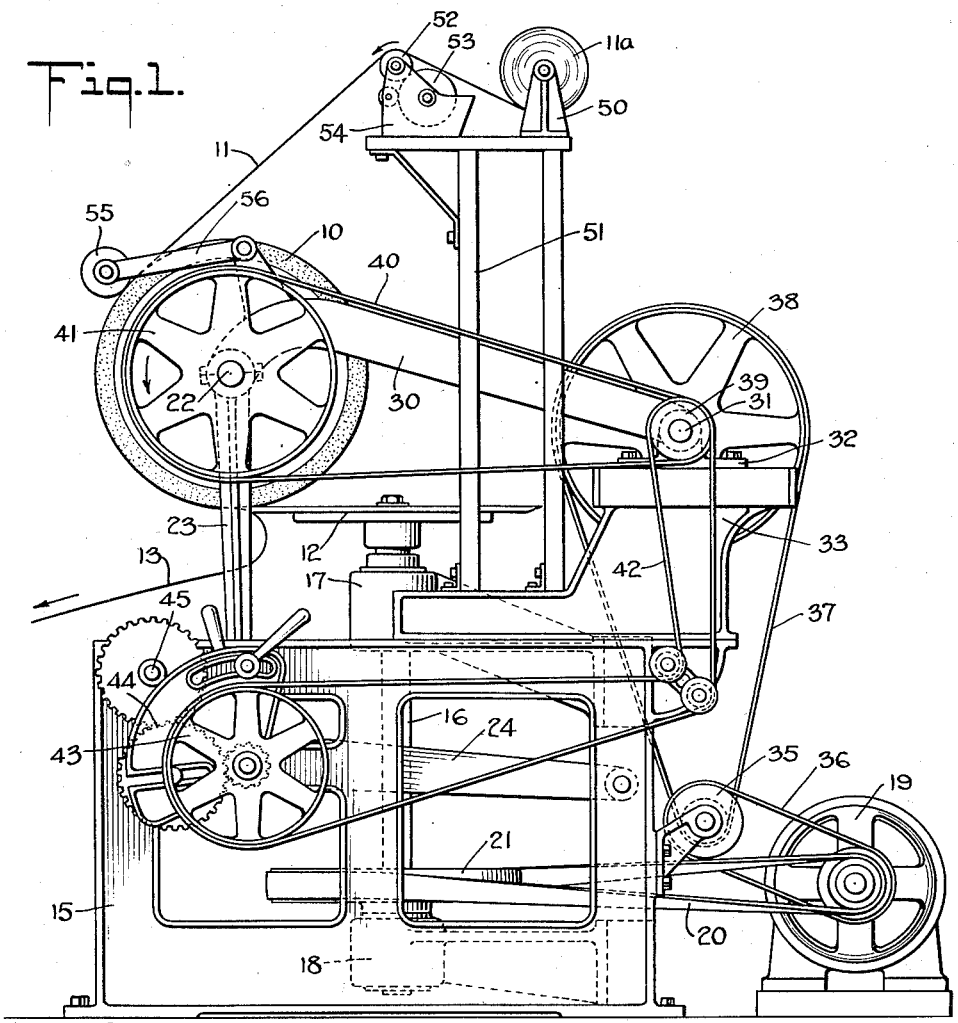
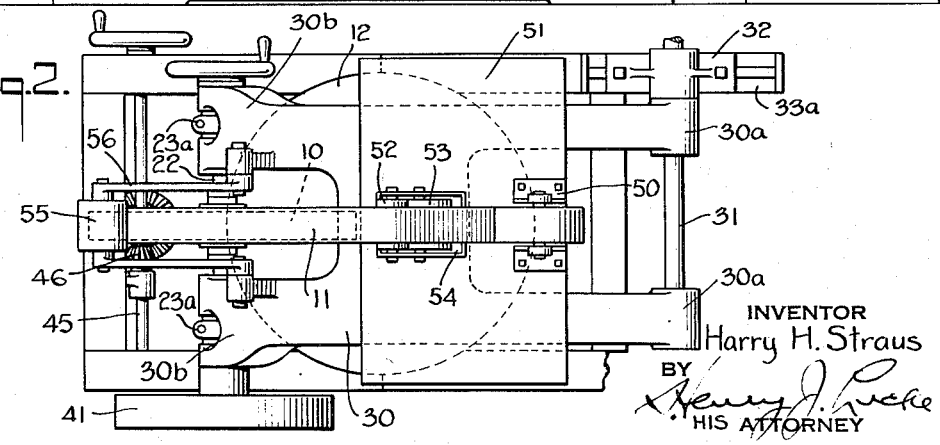
INVENTOR
Harry H. Straus
BY
HIS ATTORNEY Dec. 31, 1940.　　　　　H. H. STRAUS　　　　　2,226,953
METHOD OF PRODUCING REINFORCED SHEET CORK
Filed Oct. 20, 1936　　　　　3 Sheets-Sheet 2
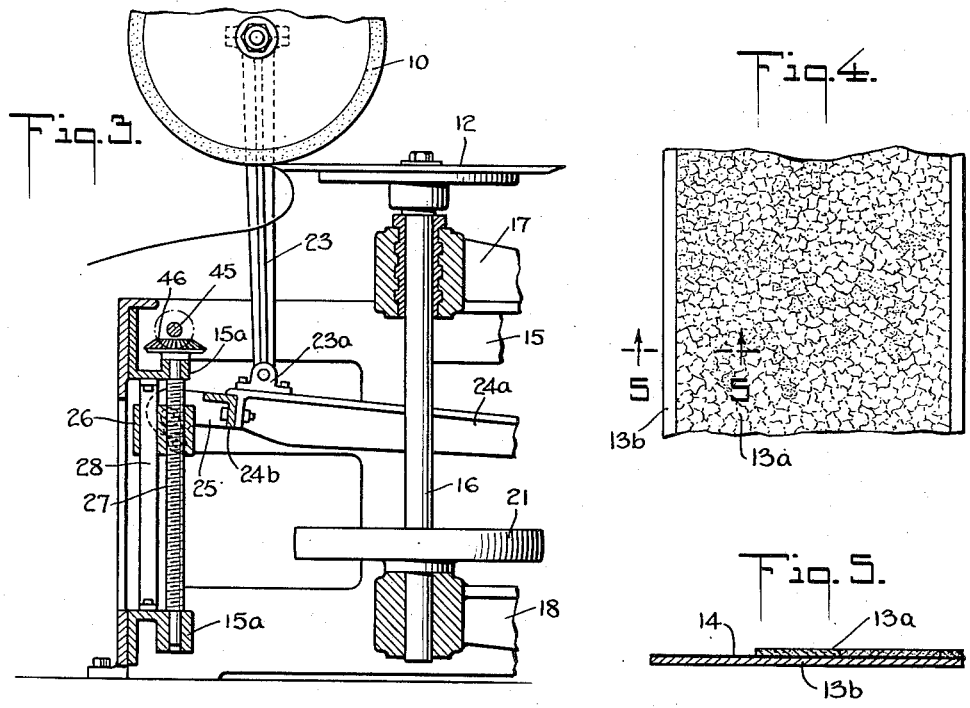
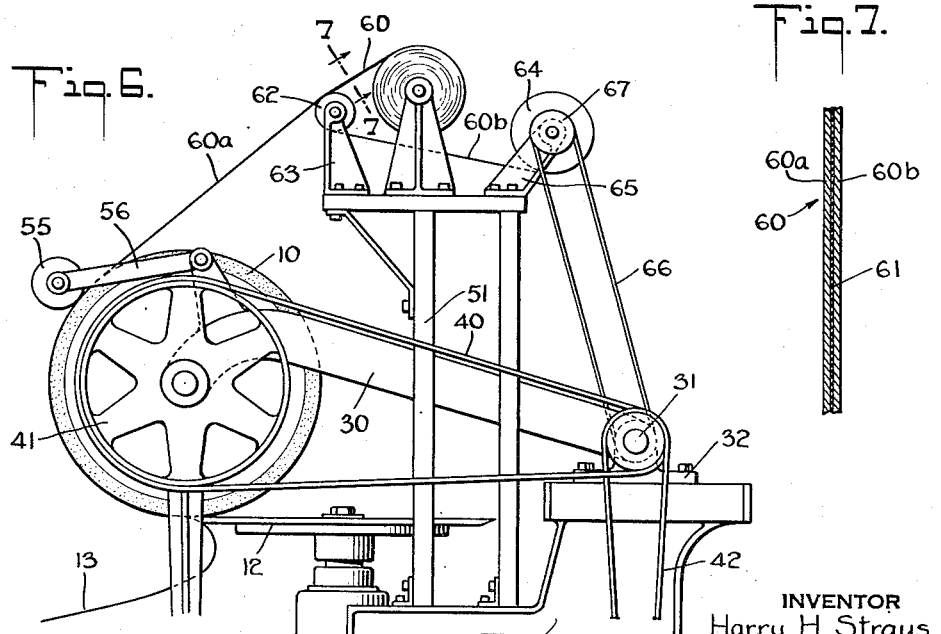
INVENTOR
Harry H. Straus
BY
HIS ATTORNEY Dec. 31, 1940.  H. H. STRAUS  2,226,953
METHOD OF PRODUCING REINFORCED SHEET CORK
Filed Oct. 20, 1936  3 Sheets-Sheet 3
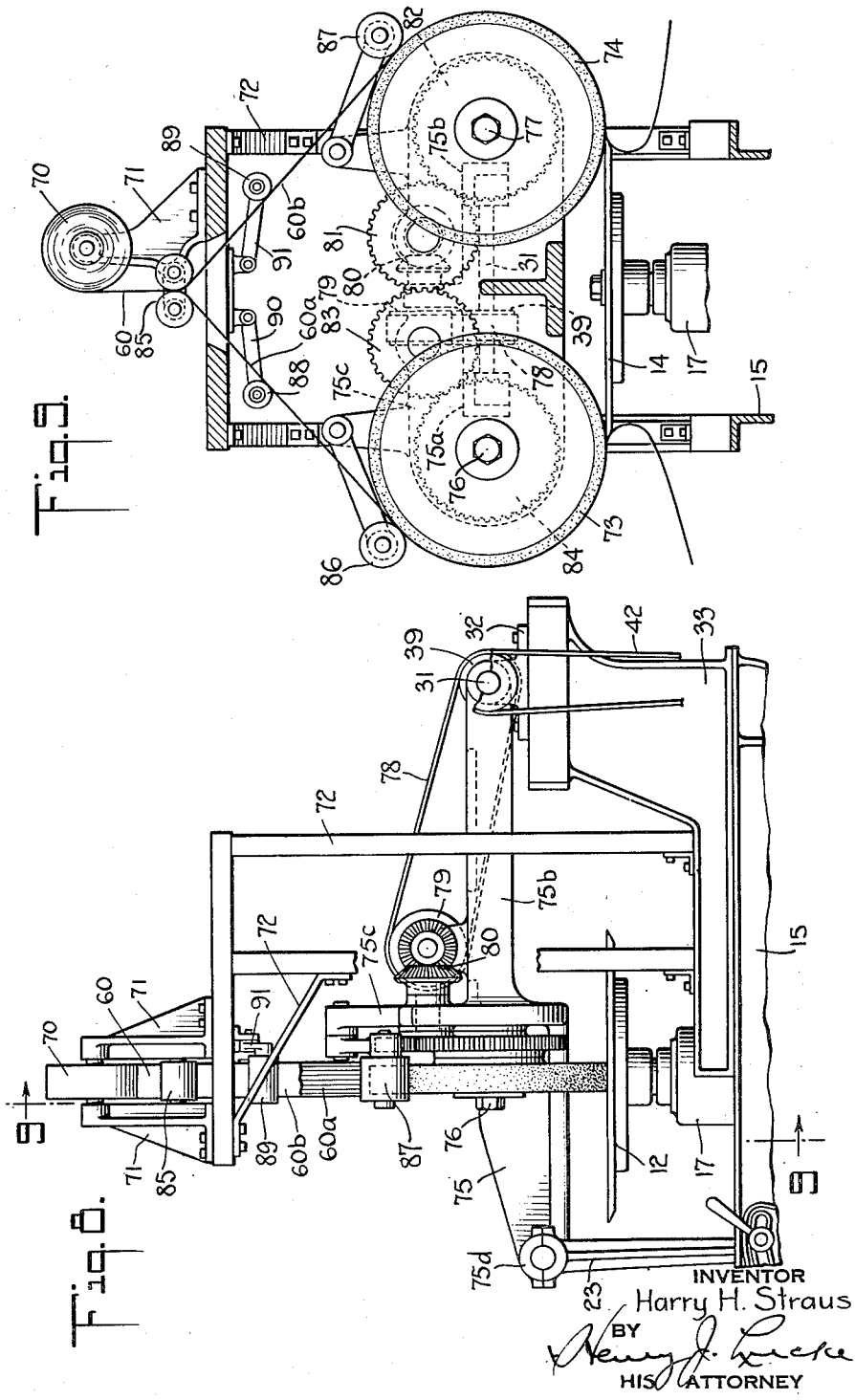
INVENTOR
Harry H. Straus
BY
HIS ATTORNEY Patented Dec. 31, 1940

2,226,953

UNITED STATES PATENT OFFICE 2,226,953

METHOD OF PRODUCING REINFORCED SHEET CORK

Harry H. Straus, New York, N. Y., assignor to Armstrong Cork Company, Lancaster, Pa., a corporation of Pennsylvania Application October 20, 1936, Serial No. 106,666

2 Claims. (Cl. 154—2)

My invention relates to a method of producing cork in sheet form with a lining, or reinforcing backing, affixed thereto.

Thin sheet cork has a variety of industrial applications, as for instance in the manufacture of cork-tipped cigarettes. The degree of thinness of the sheet of cork is usually necessarily high, and consequently special care in handling is required to prevent tearing. A thin sheet of reinforcing material, such as tissue paper, applied as a lining or backing for the cork, produces a composite sheet that may be handled with ease, free from likelihood of damage. Practice of the present method produces a continuous, composite sheet-strip comprising sheet cork of the requisite degree of thinness backed with a thin reinforcing sheet of suitable material coincidentally with the formation of the cork sheet.

According to the present method, a circular block of cork of a thickness bringing it within the classification of a disc, is rotated about its center, and a strip of suitable backing material is applied to the width of the peripheral surface of the block during the rotation of same, preferably by means of an adhesive. Coincidentally with the application of the backing strip at one location on the peripheral surface of the rotating block, a strip of cork of the desired degree of thinness, is cut from the peripheral surface of the rotating block at a suitable location within the zone of application of the backing strip. The product of the cutting operation is therefore not a strip of cork per se, but a composite strip comprising sheet cork adequately reinforced by an affixed strip of suitable backing material.

To insure uniformity of thickness of the resulting composite strip, and substantial uniformity of distribution of cork on the reinforcing backing, the operation of cutting from the block of resilient cork must be adjusted to a nicety. Pursuant to the present method, the cutting is accomplished by rotary motion of both the cutting means and the block of cork, the rotation of the block of cork and the rotation of the cutting means being correlated one with the other, and a progressive feeding the block of cork into the cutting zone being accomplished continuously.

Adhesion of the strip of backing material to the peripheral surface of the block of cork may be accomplished by any suitable means. According to a preferred practice, a composite strip of backing material comprising two component strips joined in face to face coextensive relation by an adhesive possessing the quality of retained plasticity, such as a suitable cement, spread between the contiguous faces, is fed continuously as the block rotates. The component strips are separated during the feeding process, and one of the component strips is affixed to the peripheral surface of the rotating block by means of the thus exposed fresh adhesive surface.

Advantageously both of the component strips of the composite backing strip are adapted for application as backing strips. In this case two blocks of cork may be rotated in unison and respective component strips of the composite backing strip fed to respective rotating blocks for affixation thereto by means of the respective exposed fresh adhesive surfaces.

In the drawings which illustrate preferred apparatus for carrying out the present method:

Fig. 1 represents a side elevation of apparatus adapted to carry out the method according to a preferred procedure;

Fig. 2 represents a top plan view of the apparatus of Fig. 1, certain parts of same being removed;

Fig. 3 represents a vertical section showing a fragmentary portion only of the machine illustrated in Figures 1 and 2;

Fig. 4 represents a top plan view of a fragmentary section of the product resulting from practice of the present method;

Fig. 5 represents a vertical section taken on the line 5—5, Fig. 4;

Fig. 6 is a view corresponding to that of Fig. 1, but illustrates apparatus adapted to carry out the method according to a changed procedure, in part. Certain portions of the apparatus, appearing in Fig. 1 are omitted.

Fig. 7 represents a section taken on the line 7—7, Fig. 6.

Fig. 8 represents a fragmentary side elevation of apparatus for carrying out the method according to a changed procedure, in part. Portions of the apparatus, appearing in Fig. 1 are omitted.

Fig. 9 represents a vertical section taken on the line 8—8, Fig. 8.

Referring to the drawings; pursuant to the method, an annular body of cork 10, is mounted for rotation about its center as an axis. A strip of lining or backing material 11, preferably tissue paper if the resulting product is to be used for cork-tipping cigarettes, is affixed to the width of the peripheral surface of the body of cork continuously as the body rotates. Preferably, as illustrated, the body of cork is mounted for rotation in a vertical plane, and the strip 11 is affixed at a location near the upper surface of the periphery of the body.

Coincidentally with the application of strip 11 to the rotating body 10, a thin sheet-strip of cork is cut from the peripheral surface of the body at a location extending completely across the width thereof, and within the zone at which the backing strip 14 is affixed. For affording proper characteristics for the cutting operation, suited to the resilient cork material concerned, a rotary cutting motion is had desirably by the provision of a circular knife 12 rotating in preferably a horizontal zone disposed approximately tangential to the periphery of the body 10, and preferably at a low point thereof. The resulting lined continuous strip of sheet cork 13, as a product of the present method, comprises the component cork strip 13a, see Figs. 4 and 5, and the component lining, or reinforcing backing strip 13b. Advantageously, the two component strips are affixed to each other by a layer 14 of suitable adhesive.

In carrying out the present method a precise relationship between the body of cork 10 and the rotary cutting means, i. e., the circular knife 12, must be maintained. I prefer to carry out the method by means of the apparatus illustrated.

A box frame 15 is fastened rigidly to any suitable, solid base support. The circular knife 12 is rigidly mounted on a shaft 16, journaled vertically, preferably centrally of the frame 15, in the bearing brackets 17 and 18. Rotation of the shaft 16 and therewith of the circular knife 12 is accomplished by suitable power means, such as the electric motor 19, connected by the belt 20 to the drive pulley 21, rigidly mounted on the shaft 16.

The body of cork 10 is mounted for rotation about its center as an axis in proper disposition to the cutting zone of the circular knife 12. Preferably the body is rigidly mounted on a shaft 22, the latter being journaled in the upper bearing ends 23a of the spaced, adjustable supporting legs 23. The supporting legs 23 rest respectively upon the travel-ends of respective side members 24a of a pivoted floating frame 24. Feet 23b are connected to the lower ends of respective supporting legs 23 in a manner permitting longitudinal movement therebetween. By sliding the feet lengthwise along their respective supports 24a, (only one is illustrated see Fig. 3) to a mutually coordinated setting at a desired location, adjustment of depth of cut may be effected in affording any desired thickness for the cork strip cut from the block.

The floating frame 24, has its side members 24a pivotally connected at one of their ends to the frame 15, see Fig. 1, and rigidly connected at their other ends to each other by the cross member 24b. Centrally of the cross member 24b, and rigidly secured thereto, a yoke 25 extends outwardly, and is articulatively connected with the floating block 26. The stated floating block 26 is threadedly carried by a jack shaft 27 for up and down movement thereon, and is guided in its travel by sliding engagement with the stationary element 28. The jack shaft 27 is conveniently mounted for rotation in bearing extensions 15a of the frame 15.

A bridge frame 30 having its ends bifurcated to provide the spaced bearing arms 30a, and the spaced bearing arms 30b, aids in maintaining the block of cork 10 properly disposed relative to the cutting zone of circular knife 12. The bearing arms 30b, are themselves bifurcated to receive between the bifurcations thereof, the respective ends 23a of the supporting legs 23. The shaft 22, see Fig. 2, is journaled in the bearings of arms 30b. The bearing arms 30a are supported by a main drive shaft 31, which is in turn journaled near its ends in two adjustable bearing boxes 32, (only one is illustrated). Such journal boxes 32 are slidably mounted on slideways 33a of frame elements 33 (only one set is illustrated).

The position of, and angle of attack of, the body of cork 10 relative to the cutting zone of the circular knife 12, is determined by suitable adjustment of the journal boxes 32, lengthwise relative to their respective slideways 33a.

Rotation of the body of cork 10, and rotation of the jack shaft 27, are accomplished simultaneously by the motor 19, proper reduction of speed being had in the case of jack shaft 27, by means of reduction gearing.

Rotary motion is transmitted from the motor 19 to a set of intermediate pulleys 35 by the belt 36, and subsequently is transmitted to the main drive shaft 31 by the belt 37 cooperating with the main drive pulley 38. A set of pulleys 39 transmits rotary motion from the main drive shaft 31 to the body of cork 10, directly, by means of a belt 40, cooperating with the drive pulley 41 rigidly mounted on the shaft 22, and transmits rotary motion indirectly to jack shaft 27, by means of the belt 42, cooperating with the drive pulley 43. Speed reduction gearing, indicated generally at 44, transmits the rotary motion from drive pulley 43 at a reduced speed to shaft 45. Miter gearing, indicated generally at 46, serves to transmit the rotary motion from shaft 45 to the jack shaft 27.

A continuous, uniform feed of the body of cork 10 progressively into the cutting zone of circular knife 12 is accomplished as jack shaft 27 rotates to effect constant progressive lowering of the travel-end of the floating frame 24.

The strip of backing material 11 is preferably fed continuously from a roll 11a suitably mounted, as for instance between upstanding arms of the standard 50. The standard 50 may be secured to an auxiliary frame structure 51, conveniently mounted on the frame elements 33. The strip 11 may be precoated with dried adhesive, the adhesive surface being moistened by passage over a roller 52 immediately prior to application of the strip to the peripheral surface of the cork body 10. If desired, the strip 11 may receive its coat of adhesive directly from the roller 52. Moisture or a plastic adhesive may be supplied to roller 52 by cooperating rollers, indicated generally at 53, disposed in a reservoir 54 of water or plastic adhesive, as the case may be.

A pressure roller 55 rotating freely at the free end of a hanging frame 56, the stated hanging frame being pivoted at one end to the arms 30b of bridge frame 30, see Fig. 2, presses the strip 11 to the peripheral surface of the body of cork 10 continuously as the body rotates to insure smooth and positive adhesion between the two surfaces.

Desirably, strip 11 is wider than is the peripheral surface of body 10 for insuring complete coverage of the latter surface.

According to one preferred procedure in the present method, a composite strip of backing material may be prepared and stored in rolls for use at the appropriate time. Such a composite strip is indicated at 60, Fig. 7, and comprises two component strips 60a and 60b disposed in face to face coextensive relation, being held together by a plastic adhesive 61, such as a suitable cement, spread between the contiguous faces. The roll of composite strip 60 may be mounted, see Fig. 6, in the same manner as roll 11a of the previously described figures. During the feeding process, one of the component strips 60a or 60b, here illustrated as 60b, is stripped from the other to expose a fresh adhesive surface for adherence to the cork surface of body 10. The composite strip 60 may pass over a roller 62 mounted, as for instance in the standard 63, to rotate freely, and the appropriate component strip, functioning as a cover for the plastic adhesive, may be stripped from the strip of backing material at that point, the cover strip being wound into a roll 64, conveniently mounted for rotation in the standard 65, and actuated from the drive shaft 31 by means of belt 66 cooperating with the drive pulley 67.

Advantageously, the composite strip of backing material 60, comprises component strips 60a and 60b, both capable of use for lining a strip of sheet cork. In such case, the two component strips of backing material 60a and 60b, are fed respectively simultaneously to respective bodies of cork rotating in unison.

Apparatus for carrying out the procedure is illustrated in Figs. 8 and 9. Certain of the operating characteristics and many of the detailed parts of the apparatus are similar to those of the apparatus illustrated in Figs. 1, 2 and 3; like parts are indicated by like reference characters.

A roll 70 of composite strip 60 comprising the component strips of backing material 60a and 60b, is mounted for rotation on a standard 71, secured to the frame structure 72.

Two bodies of cork 73 and 74 are mounted for rotation in unison, and are disposed in diametric opposition relative to the cutting zone of the circular knife 14, preferably on suitably configurated portions of a bridge frame 75. One end of the bridge frame 75 is bifurcated to provide bearing arms 75a and 75b for journaled engagement with the main drive shaft 31. The other end of same, indicated 75d, is of substantially T formation in section for receiving on journal ends thereof, the bearing formed in the upper ends of the adjustable legs 23. Intermediate the two ends of the bridge frame, a vertically disposed plate portion 75c provides support for the horizontal stub shafts 76 and 77. Mounted on the stated stub shafts for rotation therewith are two bodies of cork 73 and 74 respectively.

Rotation of the bodies 73 and 74, in unison, is accomplished by rotary motion transmitted from the main drive shaft 31. A belt 78, driven by the pulley 39, drives the pulley 79, which in turn actuates the miter gears, indicated generally at 80, to rotate gear 81. Gear 82, rigidly secured to the mounting of body 74, meshes with gear 81 and thus imparts the requisite rotary motion to the body 74. The gear 83 is similar to, and meshes with, the gear 81, and transmits rotary motion therefrom to the gear 84 with which it also meshes. Gear 84 is rigidly secured to the mounting of body 73, and thus imparts rotary motion to body 73. Since the two gears 81 and 83 are identical, and the two gears 81 and 84 are identical, the blocks 73 and 74 will rotate exactly in unison.

The composite strip 60, may be passed between a set of rollers 85, and be separated, as it emerges, into the component strips of backing material 60a and 60b. By the separation, a surface of plastic adhesive will be exposed on the under side of each strip. The respective strips 60a and 60b may be applied to the peripheral surfaces of the rotating blocks 73 and 74, respectively, in the manner described in reference to the previous figures, i. e., by means of pressure rollers 86 and 87 respectively.

To take up any slack that might be present in either one of the strips 60a and 60b, relative to the other, rollers 88 and 89, respectively, are provided to ride on the upper surfaces of respective strips. Arms 90 and 91, respectively, pivoted at one of their ends to the frame 72 hold the rollers 88 and 89 in place while allowing their full weight to be exerted on their respective strip supports.

The backing strip 11 may be precoated with a thermoplastic adhesive material which, when the plastic adhesive material is in dry form, and at ordinary room temperatures, has the adhesive qualities thereof latent. Under such circumstances, the backing strip, coated with the thermoplastic adhesive material, may be wound into the form of a roll, such as the roll 11a, illustrated in Fig. 1.

In applying the backing strip 11, precoated with the thermo-plastic adhesive material, to the peripheral face or edge of the cork block 10, a heated roller or plate may be substituted for the pressure roller 55. Such roller or plate applies sufficient heat to the thermo-plastic adhesive material to effect its latent adhesive qualities and such heat and pressure causes the backing strip 11 to closely adhere to the peripheral face or edge of the cork block 10.

I may use a heated plate in addition to, and in combination with the heated roll, such heated plate serving to smooth down, or iron, the backing strip 11, to the face or edge of the cork block 10.

Any suitable form of thermo-plastic adhesive material may be employed that has the adhesive qualities thereof latent at ordinary or room temperature, and which adhesive qualities are brought out when the temperature of the material is raised above such ordinary or room temperature.

In the copending application of Edmund Claxton and Herbert Paschke, Serial No. 106,639, filed October 20, 1936, now Patent No. 2,163,372, there is disclosed and broadly claimed a method of forming duplexed webs, such as cork cigarette tipping material, in which a thermally activatable adhesive is used.

Whereas I have described the present method with respect to specific procedure in its practice, it is understood that various changes may be made from time to time, without departing from the spirit of the invention as generalized in the claims that follow.

I claim:

1. A method of producing a continuous strip of lined sheet cork, comprising rotating a body of cork about its center as an axis, feeding to said body at a location extending across the width of its peripheral surface, a strip of backing material, the said strip of backing material having one face coated with a plastic adhesive and the plastic adhesive covered with a second strip of material, stripping the said second strip from the strip of backing material during the feeding process to expose the adhesive surface, affixing the strip of backing material to said body at the said location of feed by means of the exposed adhesive surface continuously as the body rotates, and, as the body rotates, cutting continuously by a rotating cutting edge a strip of cork of cigarette tipping thickness across the width of the peripheral surface of the body at a location within the zone at which the strip of backing material is affixed so that the backing web serves to reenforce the cork strip at the point of severance from the body to obviate rupture of the strip during severance.

2. A mehod of producing in unison two continuous strips of lined sheet cork, comprising rotating adjacent each other two bodies of cork about their respective axes; feeding to respective bodies respective component strips of a composite strip of backing material at a location extending across the width of the peripheral surface of the body, said composite strip comprising two component strips of backing material disposed in face to face coextensive relation with a plastic adhesive spread between contiguous faces, the said composite strip being separated into its component strips immediately prior to said feeding operation to expose the adhesive surfaces; affixing respective component strips of backing material to respective bodies at the said location of feed by means of the exposed adhesive surface continuously as the bodies rotate, and cutting continuously by a rotating cutting edge from respective bodies as they rotate, a strip of cork of cigarette tipping thickness across the width of the peripheral surface of each body at a location within the zone at which the strip of backing material is affixed so that the backing webs serve to reenforce the cork strips at their respective points of severance from their respective bodies to obviate rupture of the strips during severance.

HARRY H. STRAUS.